Figure 1:
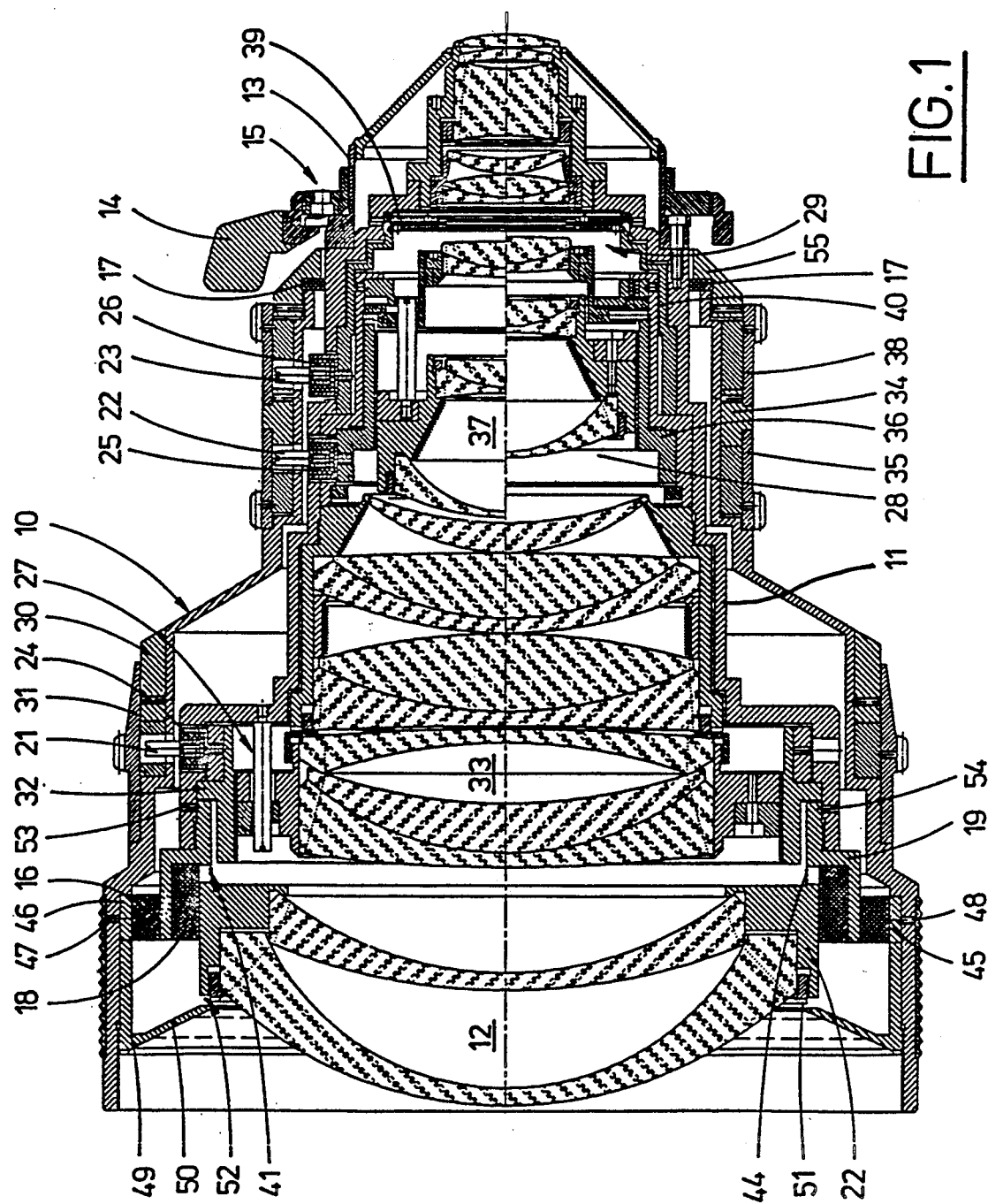

United States Patent [19]

Blaschek

[11] Patent Number: 5,009,499

[45] Date of Patent: Apr. 23, 1991

[54] SOUND INSULATED INTERCHANGEABLE LENS

[76] Inventor: Otto Blaschek, Anwanderweg 16, D-8011 Aschheim, Fed. Rep. of Germany

[21] Appl. No.: 455,166

[22] Filed: Dec. 22, 1989

[30] Foreign Application Priority Data

Dec. 24, 1988 [DE]  Fed. Rep. of Germany ....... 3843838

[51] Int. Cl.$^5$ ............................................. G03B 31/00
[52] U.S. Cl. ...................................... 352/35; 354/286
[58] Field of Search .................... 352/35, 231; 354/286

[56] References Cited

U.S. PATENT DOCUMENTS

| 3,331,653 | 7/1967 | Blascher et al. | 352/35 |
| 4,536,066 | 8/1985 | Bauer | 352/35 |
| 4,577,944 | 3/1986 | Grosser et al. | 352/35 |
| 4,816,857 | 3/1989 | Blaschek . | |

FOREIGN PATENT DOCUMENTS

| 144833 | 11/1984 | European Pat. Off. . | |
| 289693 | 5/1987 | European Pat. Off. . | |
| 428344 | 3/1975 | U.S.S.R. | 352/35 |

Primary Examiner—Monroe H. Hayes
Attorney, Agent, or Firm—Fish & Richardson

[57] ABSTRACT

An interchangeable lens suitable for use in conjunction with a motion picture camera features a lens mount 13 that is removably attached to such motion picture camera, a lens casing 11 commecting to lens mount 13, and an external casing 10 that both houses the adjusting elements of such interchangeable lens and is connected through sound-absorbing rings 16, 17, 18 to lens casing 11. An object-side buffer ring 16 and a camera-side buffer ring 17 both center and radially support, in its end zones, external casing 10 upon lens casing 11.

16 Claims, 2 Drawing Sheets

SOUND INSULATED INTERCHANGEABLE LENS

The present invention relates to an interchangeable lens as well as to a method suitable for the production of such interchangeable lens.

In film production, the noise produced by the running camera inevitably becomes a disturbing "background noise". Effective noise reduction in movie camera technology is conventionally obtained by fitting the lens assembly with a detachable anti-noise cover. This method of sound insulation, however, hampers both operation of the camera and manipulation of the lens.

In order to improve sound insulation without interfering with the manipulation of the camera lens, EP-A-87 890 090.1 discloses an interchangeable lens whose external casing is sound-insulated relative to the lens casing. Such insulation is accomplished by rigidly connecting the shell constituting the major portion of the external casing by means of a buffer ring to the flange of the interchangeable lens, which in turn can be coupled by means of a bayonet ring to the camera housing. This arrangement substantially attenuates propagation of sound waves from the camera housing to the external casing.

Effective object-side sound insulation can also be obtained by fitting a flat sheet of glass in front of the lens casing at the object-side end zone of the external casing. The glass sheet, surrounded by a buffer ring, is held in place inside a reflex guard which, being attached to the lens casing, features for the purpose of sound insulation a further buffer ring on the circumferential zone adjoining the external mount.

An object of the present invention is the improvement of an interchangeable lens of the above-mentioned type with a view to improving sound insulation while ensuring simplicity of design and low production cost.

The proposed design for the interchangeable lens admits a simple method of completely insulating the external casing from the lens casing. Rigid secureing of the buffer rings at two points obviates rigid attachment of the external casing to the lens flange and eliminates the potential for sound bridge development between lens flange and casing that could be abetted by the radial protection requied by the buffer ring arrangement enunciated in the prior art patent application. Furthermore, the method presently proposed for providing buffer rings around the lens casing allows efficient mounting of the external casing whereby the latter is axially slid over the lens casing from the camera side.

The object-side buffer ring axially secures the external casing on top of the lens casing, thus eliminating the need for special attachment of the external casing to the lens casing.

Connecting pins protruding from the lens casing both prevent development of sound bridges between the lens and the external casing of the interchangeable lens and serve to connect, by means of buffering elements, the adjusting elements located in the external casing, i.e. a focus ring, a range setting ring and an aperture ring, to corresponding adjusting mechanisms located inside the lens casing.

An alternate version of the proposed system relates to the design of the frontal zone of the lens casing. A forward lens system is borne and centred inside the lens casing by means of a sound-absorbing buffer ring. The use of a frontal lens system designed to enhance specific optical qualities in the interchangeable lens eliminates additional components needed to effectively insulate the lens casing on the object-side.

Besides absorbing sound waves that are produced by the camera mechanism and that exit frontally from the lens, the proposed forward lens system, by virtue of its arrangement inside a supportive and sound-absorbing buffer ring that also centers such forward lens system, permits effective insulation against structure-propagated sound waves. This arrangement removes the need for the installation, in the forward zone of the interchangeable lens, of bearing elements liable to conduct sound waves.

The precision with which the forward lens system is radially borne inside the buffer ring ensures exact positioning of the forward lens system along the longitudinal axis of the lens.

In a particularly advantageous embodiment of the present invention, the barrel forms, together with the lens mount of the forward lens system, a unit of production, thus permitting the buffer ring, which centers the interchangeable lens during installation, to be vulcanized into a precisely defined intermediate cavity located between the barrel and the lens mount of the forward lens system, without affecting the centering of the lens mount in relation to the barrel.

The method proposed for producing an interchangeable lens of the kind first mentioned comprises that a barrel connecting to the lens casing and serving to house the forward element, which is embodied as a forward lens system, is manufactured in one integral unit together with a lens mount of the forward lens system. A buffer ring is then vulcanized into a cavity especially provided in such production unit, whereafter the latter is separated into two individually-treated parts, which is to say, the barrel and the lens mount, whereby the buffer ring remains, following the separation procedure, attached to the screw-in barrel and the lens mount.

After the production unit is separated into barrel and lens mount, which takes place after the buffer ring has been vulcanized into position, the bore of the lens mount remains centered in relation to the bearing surface of the barrel, despite the presence of the buffer ring which has been vulcanized into place.

Vulcanization of the buffer ring inside the single-piece, annular production unit ensures that the buffer ring, even following separation of barrel and lens mount, will not affect the bearing tolerance existing between the bore of the lens mount and the bearing surface of the screw-in barrel. The original centered position, therefore, remains unchanged.

Both the object-side buffer ring, which bears the external casing and the buffer ring surrounding the forward lens system are supported upon opposing support surfaces of the barrel, which is screwed together with the lens casing. The advantage of the mutual support system of external casing, barrel and forward lens system, viewed in cross section, is that of preventing bearing forces acting in different planes from locally deforming the lens casing.

In another advantageous embodiment of the present invention, the special disposition of a reflex guard between an object-side end zone of the external casing and the forward lens system permits the existence of an annular air space between the forward lens system and the reflex guard, an arrangement that ensures that the coaxial alignment, by radial bearing inside the buffer ring, of the forward lens system relative to the longitudinal axis of the lens, will not be impaired should the forward lens system come into contact with the reflex guard.

A further advantageous feature of the present invention provides for axial positioning by the reflex guard of the object-side buffer ring inside the external casing. The object-side buffer ring, being vulcanized to the inner surface of a casing, fixes in place the external casing relative to the lens casing.

Alternate advantageous designs of the present invention are described in the subsidiary claims.

The present invention will next be described in greater detail with the aid of drawings of embodiment examples.

Figure 2:
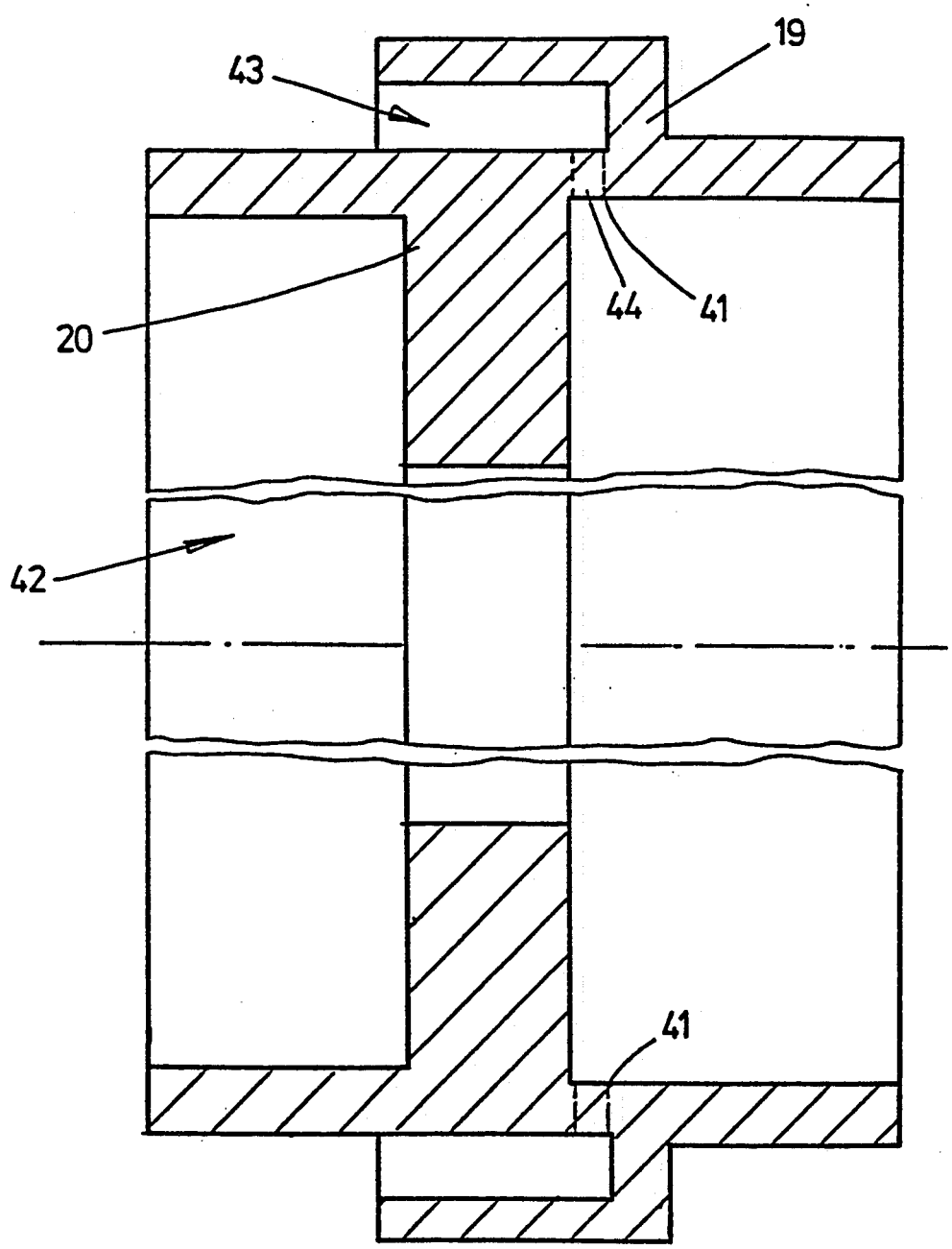

Shown are:

FIG. 1 a longitudinal section through an interchangeable lens, along the axis of such lens;

FIG. 2 a longitudinal section through an unfinished mounting element for the forward lens system.

FIG. 1 shows a sound-insulated interchangeable lens comprising essentially an external casing 10, a lens casing 11 and a forward lens system 12. The interchangeable lens is, for the purpose of attachment to a schematically-drawn motion picture camera 1*, provided with a lens mount 13 attaching directly to lens casing 11, and is capable of being inserted into a camera bayonet 15 that can be locked with the aid of a locking lever 14.

External casing 10 is radially supported, through buffer rings 16, 17, on top of lens casing 11. Buffer rings 16 and 17 are thus able to act at the same time as centering elements. Object-side buffer ring 16 also axially secures external casing 10 in relation to lens casing 11.

Lens system 12, which fits inside lens casing 11, is radially borne by a further buffer ring 18 arranged between a screw-in barrel 19, which forms an extension of lens casing 11 on the object side, and a lens mount 20 of forward lens system 12. The manner in which the latter fits into buffer ring 18 precludes structural contact between screw-in barrel 19 and lens mount 20.

The proposed arrangement of forward lens system 12 inside lens casing 11 prevents sound waves, which are conducted from the mechanism of motion picture camera 1 to lens casing 11, from exiting through forward lens system 12 toward the object. The insulation by means of buffer rings 16, 17, of external casing 10 from lens casing 11 serves to radially protect lens casing 11 from the environment.

Connecting pins 21, 22, 23, which extend from lens casing 11 into external casing 10 and permit the control of adjustment mechanisms located inside lens casing 11, are prevented from becoming sound bridges between lens casing 11 and external casing 10 by being borne, in the zone of lens casing 11, inside buffer elements 24, 25, 26.

The adjustment mechanisms comprise, more particularly, a focus regulator 27, a depth of field setter 28 and an aperture setter 29. Catch pin 21 serves to mechanically couple to focus regulator 27 a focus ring 31 that can be rotated about a fine-adjustment ring 30 that is attached to external casing 10. Focus ring 31 permits selection from a range of focal depths obtainable with the interchangeable lens, which is embodied as a zoom lens for the purposes of the present embodiment.

In this embodiment, focus regulator 27 comprises essentially a zoom lens system 33 that can be slid, with the aid of an adjustment ring 32, along the longitudinal axis of the interchangeable lens. In order to be able to adjust the interchangeable lens to the proper focal depth, a distance ring 35, which can be rotated relative to external casing 10 and a fine-adjustment ring 34, regulates, by means of catch pin 22, the position of focusing lens system 37, which can be slid by means of an adjustment ring 36 along the longitudinal axis of the interchangeable lens.

Catch pin 23, finally, serves to connect an aperture ring 38, which can be rotated relative to external casing 10, to a carrier casing 40 that regulates an aperture mechanism 39.

Forward lens system 12 connects by means of screw-in barrel 19 to lens casing 11. Buffer ring 18, which radially encloses lens mount 20 of forward lens system 12, serves to sound-insuslate forward lens system 12 from screw-in barrel 19. The latter, together with buffer ring 18 and lens mount 20 form an integral unit, since buffer ring 18 is annularly vulcanized into position between screw-in barrel 19 and lens mount 20.

In order to maintain the sound-insulating function of buffer ring 18, an annular axial gap 41 is provided between lens mount 20 and screw-in barrel 19 and so prevents lens mount 20 from coming into direct contact with screw-in barrel 19.

Because centering of forward lens system 12 in relation to the overall optical system of the interchangeable lens is highly important, this function must be taken into consideration during manufacture of the unit comprising screw-in barrel 19, buffer ring 18 and lens mount 20. For this reason, a special process is used to assemble the unit.

Produced first is a single-piece production unit 42 comprising screw-in barrel 19 and lens mount 20 and embodied as an unfinished piece as illustrated in FIG. 2. Next, buffer ring 18 is annularly vulcanized into an intermediate annular space 43 of production unit 42. Following the vulcanizing step, production unit 42 is finished by lathing.

In the final production step following lathing, removal of the piece of material 44 remaining between lens mount 20 and screw-in barrel 19 produces gap 41, which prevents direct contact between lens mount 20 and screw-in barrel 19. Piece of material 44, which is removed before forward lens system 12 is mounted, is indicated in FIG. 1 by a broken line.

Buffer ring 16 is fitted over the circumference of screw-in barrel 19 in order both to center external casing 10 and to axially position external casing 10 in relation to lens casing 11. Buffer ring 16 is, to this end, vulcanized to the inner surface of a casing 45, which sits axially against a shoulder 46 of external casing 10. Threaded pins 47, 48 serve to maintain casing 45 in this position.

At the object side of the lens assembly, a reflex guard 49 is screwed into external casing 10 to stop against casing 45. Reflex guard 49 extends obliquely with its protective wall 50 from external casing 10 to forward lens system 12 and permits the existence of an annular, axial air gap 52 between protective wall 50 and a forward threaded ring 51 of forward lens system 12. Reflex guard 49 is thus prevented from interfering with the centering by buffer ring 18 of forward lens system 12.

This embodiment of the interchangeable lens permits very simple mounting of three components (external casing 10, lens casing 11 and forward lens system 12) which ae separated by buffer rings 16, 17, 18.

Beginning at lens casing 11, forward lens system 12 is screwed together with screw-in barrel 19 into lens casing 11 where it is held in position by threaded pins 53, 54. Next, external casing 10 is slid away from the camera body along lens casing 11 until bore shoulder 46 comes to rest against casing 45 of buffer ring 16, which has already been fitted over the circumference of screw-in barrel 19.

After connecting pins 21, 22 23 have been screwed into buffer elements 24 25 26 of lens casing 11, the auxiliary components of external casing 10, such as focus ring 31, fine-adjustment ring 30, distance ring 35, and fine-adjustment ring 34, can be installed. A support ring 55 is then screwed together with a buffer ring 17 located inside such support ring 55 in order to support external casing 10 in the zone adjoining the camera. The installation of aperture ring 38 completes the assembly of external casing 10. Finally, reflex guard 49 is screwed, at the object side, into external casing 10.

The scope of application of the proposed system is not restricted to the embodiment example described. Rather, a number of alternate versions can be comtemplated, which, despite having fundamentally different designs, are able to employ the proposed solution.

I claim:

1. An interchangeable lens that can be removably mounted to a motion picture camera housing, comprising mount structure for removable attachement to said camera housing, external casing structure, said external casing structure comprising adjusting elements of said interchangeable lens, lens casing structure connecting said mount structure and said external casing structure;

first sound-absorbing buffer ring structure located on the object side of said interchangeable lens and connecting said external casing structure to said lens casing structure, second sound-absorbing buffer ring structure located on the camera side of said interchangeable lens, said first and second buffer ring structures serving to radially support and center said external casing structure at end zones thereof on said lens casing structure, third sound-absorbing buffer ring structure, and a forward lens system in the forward zone of said lens casing structure and connected to said lens casing structure, said forward lens system being both centrally borne in relation to said lens casing structure and being connected to said external casing structure by means of said third sound-absorbing buffer ring structure.

2. The interchangeable lens of claim 1 wherein said first sound-absorbing buffer ring structure axially positions said external casing structure in relation to said lens casing structure.

3. The interchangeable lens of claim 1 wherein said adjusting elements of said external casing structure are connected to corresponding adjusting mechanisms situated inside said lens casing structure by means of connecting pins which protrude from said lens casing structure and are received in sound-absorbing buffer elements.

4. The interchangeable lens of claim 3 and further including reflex guard structure threadedly coupled to said external casing structure and arranged between the object-side end zone of said external casing structure and said forward lens system such that there is an annular air gap between said forward lens system and said reflex guard structure.

5. The interchangeable lens of claim 4 and further including a sleeve member seated on an inner surface of said external casing structure, and wherein said first sound-absorbing buffer ring structure is vulcanized to an inner surface of said sleeve member and said reflex guard structure axially abuts said sleeve member.

6. The interchangeable lens of claim 1 wherein said lens casing structure has a barrel poriton, said forward lens system has lens mount and said first sound-absorbing buffer ring structure is vulcanized into an intermediate cavity of said barrel portion of said lens casing structure and said lens mount of said forward lens system.

7. The interchangeable lens of claim 6 wherein said barrel poriton constitutes a component of said lens casing structure that both serves to extend said lens casing structure toward the front and is threadedly coupled to the body of said lens casing structure.

8. A method of producing the interchangeable lens of claim 7 wherein said forward lens system lens mount is initially manufactured as a unitary portion of said lens casing structure with a cavity between said lens mount and said barrel portion, and including the step of separating said forward lens system lens mount from said lens casing structure following said vulcanization of said first sound-absorbing buffer ring structure in said cavity so that said first buffer ring structure remains connected following said separation step to both said barrel portion and said forward lens system lens mount.

9. The interchangeable lens of claim 1 wherein said lens casing structure has a barrel portion with opposed bearing surfaces, and said first and third sound-absorbing buffer ring structures are secured on said opposed bearing surfaces of said barrel poriton of said lens casing structure.

10. A method of producing the interchangeable lens of claim 9 wherein said forward lens system lens mount is initially manufactured as a unitary protion of said lens casing structure, and including the step of separating said forward lens system lens mount from said lens casing structure following securing of said first and third sound-absorbing buffer ring structures to said barrel portion so that said first buffer ring structure remains connected, following said separation step to both said barrel portion and said forward lens system lens mount.

11. The interchangeable lens of claim 1 and further including reflex guard structure threadedly coupled to said external casing structure and arranged between the object-side end zone of said external casing structure and said forward lens system such that there is an annular air gap between said forward lens system and said reflex guard structure.

12. The interchangeable lens of claim 11 and further including a sleeve member seated on an inner surface of said external casing structure, and wherein said first sound-absorbing buffer ring structure is vulcanized to an inner surface of said sleeve member and said reflex guard structure axially abuts said sleeve member.

13. The interchangeable lens of claim 12 wherein said adjusting element of said external casing structure are connected to corresponding adjusting mechanisms situated inside said lens casing structure by means of connecting pins which protrude from said lens casing structure and are received in sound-absorbing buffer elements.

14. The interchangeable lens of claim 13 wherein said first sound-absorbing buffer ring structure axially positions said external casing structure in relation ot said lens casing structure.

15. The interchangeable lens of claim 14 wherein said lens casing structure has a barrel portion, said forward lens system has a lens mount, and said first sound-absorbing buffer ring structure is vulcanized into an intermediate cavity between said barrel portion of said lens casing structure and said lens mount of said forward lens system.

16. The interchangeable lens of claim 15 wherein said first and third sound-absorbing buffer ring structures are supported by opposing bearing surfaces of said barrel portion.

* * * * *